United States Patent Office 3,032,466
Patented May 1, 1962

3,032,466
ACARICIDALLY ACTIVE DITHIOPHOSPHORIC ACID ESTERS
Max Schuler, Arlesheim, Switzerland, assignor to Sandoz Ltd., Basel, Switzerland
No Drawing. Filed Mar. 1, 1960, Ser. No. 11,995
Claims priority, application Switzerland Mar. 10, 1959
20 Claims. (Cl. 167—30)

The present invention is concerned with acaricidally active dithiophosphoric acid esters as well as with compositions containing the same and with the use thereof particularly in combating spider mites.

The acaricidally active dithiophosphoric acid esters of the present invention, which are new compounds, correspond to the formula

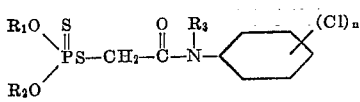

wherein each of $R_1$, $R_2$ and $R_3$ is a methyl group or an ethyl group, and $n$ is one of the integers 1, 2 or 3.

The new compounds I are conveniently prepared by reacting a compound of the formula

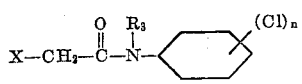

with a compound of the formula

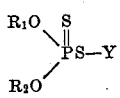

the variables $R_1$, $R_2$, $R_3$ and $n$ having the same significances in Formulae II and III that they have in Formula I, X being a halogen atom, and Y representing a cation. In those cases where Y is a hydrogen atom, the reaction is carried out in the presence of an acid-binding agent. It is preferred that the reaction be effected in a solvent, such as water, acetone, dioxane and the like, or in a mixture of such solvents, at ambient or slightly elevated temperature.

Illustrative of suitable compounds of Formula II are e.g. chloroaceto-N-methyl-4-chloroanilide, bromoaceto-N-methyl - 4 - chloroanilide, chloroaceto - N - ethyl - 4 - chloroanilide, chloroaceto - N - methyl - 3,4 - dichloroanilide, chloroaceto - N - methyl - 2,5 - dichloroanilide, as well as the other corresponding chloroaceto-N-methyl- and chloroaceto-N-ethyl-polychloroanilides.

Illustrative of suitable compounds of Formula III are for example:

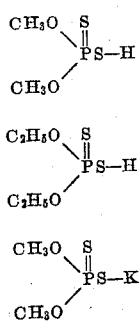

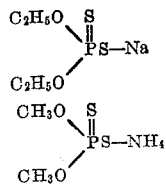

etc.

The dithiophosphoric acid esters I, prepared by the precedingly described process, are obtained—depending upon their constitution—as oils which at room temperature (about 20° to about 30° C.) are viscous and which can not be distilled under reduced pressure without decomposition, or as colorless crystals. They are stable in aqueous suspension, and are generally soluble in oils and in the usual organic solvents. The new esters have an outstanding acaricidal activity, and are characterized by low toxicity for warm-blooded animals. They can therefore safely and very effectively be used for combating eggs and active stages of spider mites (Tetranychidae sp.) in the protection of plants. For special purposes, the new dithiophosphoric acid esters can also be used in combination with known insecticides and/or fungicides, or in admixture with these.

The new compounds I are characterized by especially valuable dual properties. On the one hand, they are characterized by unexpectedly magnitudinously enhanced acaricidal activity in comparison with the corresponding non-N-alkylated anilides. On the other hand, the nuclearly chlorinated compounds possess the wholly unexpected advantage of significantly lower toxicity to warm-blooded animals, in comparison with the corresponding non-chlorinated compounds.

The following data illustrate the acaricidal activity of the new compounds I:

DETERMINATION OF OVICIDAL ACTIVITY

A ring of glue is provided on each of a number of bean leaves—bush beans (Phaseolus vullgaris L.)—in the second leaf stage, each ring having an inner diameter of about 25 mm. About 20 adult female bean spider mites (Tetranychus telarius) are transferred into the ring by means of a camel's-hair brush and allowed to remain there for 24–48 hours. During this period of time, the females lay 80 to 100 eggs. The females are then removed. Each entire leaf with the eggs deposited thereon is then immersed for 3 seconds in the acaricide liquor. After the hatching of the larvae of the untreated control, which requires 4 to 8 days, the hatched and dead eggs are counted.

DETERMINATION OF CONTACT ACTIVITY

A soft peat plate is fixedly mounted on a frame beneath a well developed leaf. A soft plastic ring, 5 mm. high and 20 mm. in inner diameter, is applied to the leaf and is stuck fast to the peat plate by means of hooked needles. The upper edge of the plastic ring is lightly coated with "Raupenleim" (a petroleum product used for protecting trees against caterpillars, etc.). Twenty adult Tetranychus females are then transferred into the ring by means of a camel's-hair brush, and are lightly sprayed with the acaricide liquor by means of a hand-sprayer. The living and dead mites are counted with the aid of a binocular magnifying glass at the end of 24 and 48 hours and, if necessary, also at the end of 5 days.

GENERAL REMARKS

The foregoing tests are conveniently carried out in the greenhouse at an average temperature of 20–22° C. The potted bean plants are well watered. Humidity is not high.

The following table summarizes the results obtained.

Table I

| Compound | Concentration, percent | Ovicidal Action, percent | Contact Action, percent after— 1 day | Contact Action, percent after— 2 days | Toxicity $LD_{50}$ oral, white mouse, mg./kg. |
|---|---|---|---|---|---|
| $(CH_3O)_2P(S)S-CH_2-C(O)-NH-C_6H_5$ | 0.05 | 0 | 15 | 45 | ......... |
| $(C_2H_5O)_2P(S)S-CH_2-C(O)-NH-C_6H_5$ | 0.05 | 0 | 10 | 30 | ......... |
| $(C_2H_5O)_2P(S)S-CH_2-C(O)-NH-C_6H_4-Cl$ | 0.05 | 0 | 60 | 95 | ......... |
| $(C_2H_5O)_2P(S)S-CH_2-C(O)-NH-C_6H_4-NO_2$ | 0.05 / 0.02 | 10.2 / 0 | 5 / 0 | 10 / 10 | ......... |
| $(CH_3O)_2P(S)S-CH_2-C(O)-N(CH_3)-C_6H_5$ | 0.02 / 0.01 | 100 / 100 | 95 / 95 | 100 / 100 | 11.6 |
| $(C_2H_5O)_2P(S)S-CH_2-C(O)-N(CH_3)-C_6H_5$ | 0.02 / 0.01 | 95.2 / 94.3 | 100 / 50 | 100 / 95 | 36 |
| $(CH_3O)_2P(S)S-CH_2-C(O)-N(CH_3)-C_6H_4-Cl$ | 0.02 / 0.01 | 100 / 100 | 95 / 80 | 100 / 100 | 210 |
| $(C_2H_5O)_2P(S)S-CH_2-C(O)-N(CH_3)-C_6H_4-Cl$ | 0.02 / 0.01 | 100 / 100 | 100 / 95 | 100 / 100 | 200 |
| $(C_2H_5O)_2P(S)S-CH_2-C(O)-N(CH_3)-C_6H_3(Cl)_2$ (2,4-Cl) | 0.02 / 0.01 | 100 / 100 | 100 / 100 | 100 / 100 | 450 |
| $(CH_3O)_2P(S)S-CH_2-C(O)-N(CH_3)-C_6H_3(Cl)_2$ (2,6-Cl) | 0.02 / 0.01 | 100 / 100 | 100 / 95 | 100 / 100 | 170 |
| $(C_2H_5O)_2P(S)S-CH_2-C(O)-N(CH_3)-C_6H_3(Cl)_2$ (2,6-Cl) | 0.02 / 0.01 | 100 / 100 | 100 / 100 | 100 / 100 | 290 |
| $(CH_3O)_2P(S)S-CH_2-C(O)-N(CH_3)-C_6H_3(Cl)_2$ (2,4,-Cl variant) | 0.02 / 0.01 | 100 / 100 | 100 / 90 | 100 / 100 | 240 |

In practice—i.e. in the field or garden as well as in the greenhouse—the combating of the spider mites with the aid of the dithiophosphoric acid esters I of the present invention, is preferably carried out by admixing the ester with an emulsifier, e.g. a liquid polyglycolether resulting from the addition of ethylene oxide onto a high molecular alcohol, mercaptan or alkylphenol, emulsifying the resultant mixture in water, and spraying the obtained emulsion onto the surfaces to be treated or protected. Further suitable organic solvents, such as mono- or polyalcohols, ketones, aromatic hydrocarbons, mineral oils, etc., can be incorporated into the emulsion as solution aids. However, solid carriers such as talc, kaolin, kieselguhr, bentonite, etc. can also be incorporated into the emulsions, if it is desired to prepare powdered products capable of being suspended in water. The liquid or pulverulent products of the indicated type are converted into aqueous emulsions or dispersions prior to use, it being preferable that the resultant emulsions or dispersions contain 0.005 to 0.1% by weight of active ester I.

However, the dithiophosphoric acid esters I can also be used without addition of emulsifiers, but can, if necessary or desired, be worked up into dusting or scattering compositions with an inert carrier, as previously enumerated, or with a mixture of such carriers, if necessary or desired also with addition of an adhesive agent.

The following examples set forth presently-preferred exemplary embodiments of the invention, solely by way of illustration and not by way of limitation. In these examples, parts are by weight unless otherwise indicated; the relationship between parts by weight and parts by volume is the same as that between grams and milliliters. Percentages are by weight; temperatures are in degrees centigrade.

EXAMPLE 1

126.3 parts of chloroaceto-N-methyl-2,5-dichloro-anilide (M.P. 60°) and 102 parts of ammonium diethyl-dithiophosphate are, together with 400 parts by volume of acetone and while stirring the reaction mixture, refluxed for 1 hour. After cooling the reaction mixture, 1500 parts by volume of water are added, the mixture then extracted with ether, and the ether extract dried with sodium sulfate. After the ether is distilled off, there is obtained a light oil which, on cooling, solidifies to a colorless crystalline mass and which consists chiefly of the compound of the formula

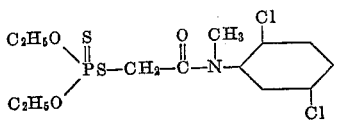

M.P. 72–73°. S calc., 15.9%; found, 15.6%. Cl calc., 17.6%; found, 18.0%.

EXAMPLE 2

The procedure according to Example 1 is repeated, starting from 126.3 parts of chloroaceto-N-methyl-3,4-dichloroanilide (M.P. 83°) and 88 parts of ammonium dimethyldithiophosphate. There is thus obtained an almost colorless oil consisting of the compound of the formula

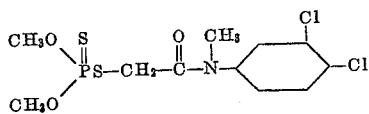

which, on standing, solidifies to a colorless crystalline mass. M.P. 64°.
S calc., 17.1%; found, 17.4%. Cl calc, 19.0%; found, 18.9%.

EXAMPLE 3

109 parts of chloroaceto-N-methyl-4-chloroanilide (M.P. 56°) and 98 parts of potassium dimethyldithiophosphate are stirred together, in 350 parts by volume of dioxane, for 3 hours at 60–70°. Upon cooling of the reaction mixture, 1000 parts by volume of water are added, after which the diluted mixture is extracted with ether. The ethereal solution is dried with sodium sulfate, after which the solvent is distilled off on the water-bath, using water-jet vacuum at the end of the distillation. The compound of the formula

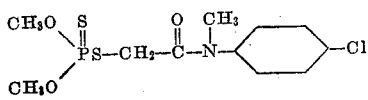

is thus obtained as an almost colorless oil which, in high vacuum, can not be distilled without decomposition.
$n_D^{20}$ 1.5789. S calc., 18.9%; found, 18.9%. Cl calc., 10.4%; found, 10.4%.

EXAMPLE 4

109 parts of chloroaceto-N-methyl-4-chloroanilide and 104 parts of sodium diethyldithiophosphate are stirred together, in 500 parts by volume of chlorobenzene, for 10 hours at 65–70°. After the reaction mixture has cooled down to 20°, it is washed with 1000 parts by volume of water, the chlorobenzene layer separated and dried, and the solvent distilled off on the water-bath in a water-jet vacuum. There is thus obtained a clear light oil consisting chiefly of the compound of the formula

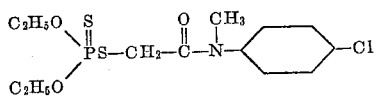

which is not distillable without decomposition in a high vacuum. $n_D^{20}$ 1.5669.
S calc., 17.5%; found, 17.5%. Cl calc., 9.7%; found, 9.6%.

EXAMPLE 5

50.5 parts of chloroaceto-N-methyl-2,5-dichloroanilide (M.P. 59°) and 35.0 parts of ammonium dimethyldithiophosphate are heated to reflux, in 200 parts by volume of acetone and while stirring the mixture, for 2 hours. After cooling the reaction mixture down to 20°, 750 parts by volume of water are added, the diluted mixture is extracted with ether, the ether extract dried with sodium sulfate, and then the ether distilled off. The so-obtained oily residue, consisting of the compound of the formula

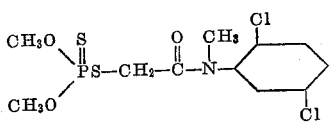

solidifies, upon cooling, to a colorless crystalline mass, which can be purified by recrystallization from ether or alcohol. M.P. 79°.
S calc., 17.1%; found, 16.9%. Cl calc., 19.0%; found, 19.0%.

EXAMPLE 6

109 parts of chloroaceto-N-methyl-4-chloroanilide are stirred into a solution of 79 parts of O,O-dimethyldithiophosphoric acid in 500 parts by volume of benzene. Then 35 parts of a 25% aqueous ammonia solution (d 15/15= 0.910) are added dropwise in the course of 30 minutes, after which stirring is continued for 8 more hours at 60–70°. After the mixture has been cooled to 20°, 500 parts by volume of water are stirred in, and the benzene layer separated in a separating funnel and dried with sodium sulfate, after which the solvent is distilled off on the water-bath, the distillation being concluded in a water-jet vacuum. The compound of the formula

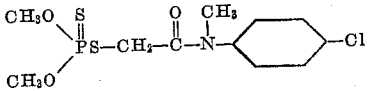

(cf. Example 3) is obtained as a light viscous oil.
In manner analogous to that of Examples 1 to 6, the compounds enumerated in the following table are also obtained:

Table II

| Example No. | Compound | Properties | S calc., found, percent | Cl calc., found, percent |
|---|---|---|---|---|
| 7 | (CH$_3$O)$_2$P(S)—S—CH$_2$—C(O)—N(CH$_3$)—C$_6$H$_3$Cl$_2$ | light viscous oil, $n_D^{20}$ 1.5838. | 17.1 / 17.1 | 19.0 / 18.8 |
| 8 | (C$_2$H$_5$O)$_2$P(S)—S—CH$_2$—C(O)—N(CH$_3$)—C$_6$H$_3$Cl$_2$ | light viscous oil, $n_D^{20}$ 1.5700. | 15.9 / 15.8 | 17.6 / 17.1 |
| 9 | (C$_2$H$_5$O)$_2$P(S)—S—CH$_2$—C(O)—N(CH$_3$)—C$_6$H$_3$Cl$_2$ | light yellow oil $n_D^{20}$ 1.5757 forms crystals M.P. 71–72°. | 15.9 / 16.2 | 17.6 / 17.4 |
| 10 | (CH$_3$O)$_2$P(S)—S—CH$_2$—C(O)—N(C$_2$H$_5$)—C$_6$H$_4$Cl | light oil, $n_D^{20}$ 1.5673. | 18.1 / 18.3 | 10.0 / 10.1 |
| 11 | (C$_2$H$_5$O)$_2$P(S)—S—CH$_2$—C(O)—N(C$_2$H$_5$)—C$_6$H$_4$Cl | light viscous oil, $n_D^{20}$ 1.5523. | 16.8 / 16.8 | 9.3 / 8.8 |
| 12 | (CH$_3$O)$_2$P(S)—S—CH$_2$—C(O)—N(C$_2$H$_5$)—C$_6$H$_3$Cl$_2$ | yellowish viscous oil $n_D^{20}$ 1.5709. | 16.5 / 16.2 | 18.3 / 17.9 |
| 13 | (C$_2$H$_5$O)$_2$P(S)—S—CH$_2$—C(O)—N(C$_2$H$_5$)—C$_6$H$_3$Cl$_2$ | yellowish oil $n_D^{20}$ 1.5570. | ---------- | 17.0 / 17.4 |
| 14 | (CH$_3$O)$_2$P(S)—S—CH$_2$—C(O)—N(CH$_3$)—C$_6$H$_2$Cl$_3$ | light viscous oil $n_D^{20}$ 1.5953. | ---------- | 26.0 / 25.9 |
| 15 | (C$_2$H$_5$O)$_2$P(S)—S—CH$_2$—C(O)—N(CH$_3$)—C$_6$H$_2$Cl$_3$ | light viscous oil $n_D^{20}$ 1.5760. | ---------- | 24.4 / 23.8 |

EXAMPLE 16

50 parts of the ester of the formula

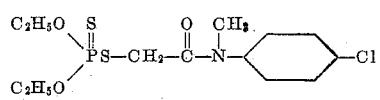

are admixed with 50 parts of nonylphenylnonaglycolether, a clear solution resulting. A 0.04% aqueous emulsion of this solution has an excellent activity against all stages of spider mites, e.g. *Tetranychus telarius, Paratetranychus pilosus*, etc. The esters of the formulae

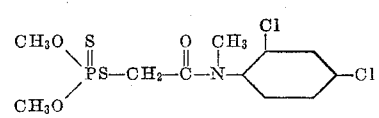

and

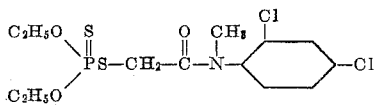

can, in corresponding quantity, be used in this way with like success.

EXAMPLE 17

50 parts of the ester of the formula

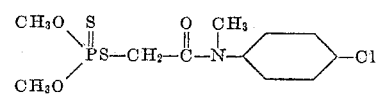

are admixed with 40 parts of tert. dodecylmercaptanundecaglycolether, [C$_{12}$H$_{25}$S(CH$_2$CH$_2$O)$_{11}$H] and 10 parts by weight of a mineral oil having the following properties: boiling point 320–405°, 20–23% sulfonatable fractions, specific gravity (20°) 0.90–0.92. A clear solution of good emulsifiability in water, is obtained. An aqueous emulsion of such solution, which emulsion contains 0.01% of the ester, has a 100% killing action on all stages of spider mites, e.g. those enumerated in Example 16.

Similarly employed, a corresponding quantity of the ester of the formula

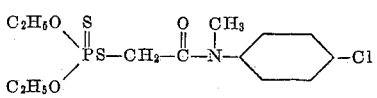

gives equally successful results.

EXAMPLE 18

By admixing 25 parts of the ester of the formula

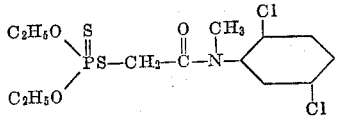

with 25 parts of isooctylphenylheptaglycolether and 50 parts of methylethylketone, a spraying agent is obtained which is emulsifiable in water. A 0.1% aqueous emulsion of this agent has an unfailing killing action on all stages of spider mites, e.g. those enumerated in Example 16.

In like manner, a corresponding quantity of any one of the esters of the formulae

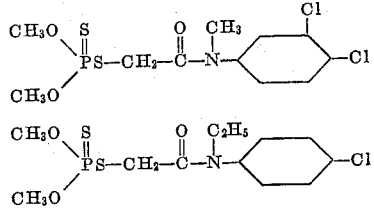

or

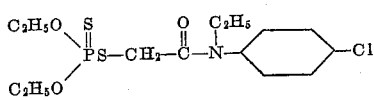

can be used with like success.

EXAMPLE 19

3 parts of the ester of the formula

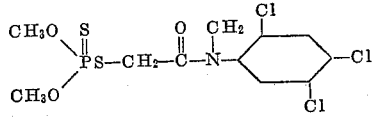

are admixed with 10 parts of fine kieselguhr and 80 parts of talc, and the mixture ground to produce a fine dusting agent of good activity against spider mites.

A corresponding quantity of any one of the esters of the formulae

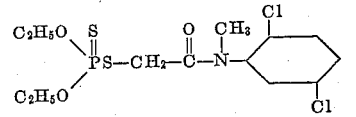

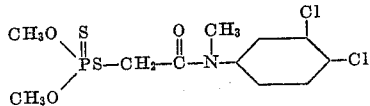

or

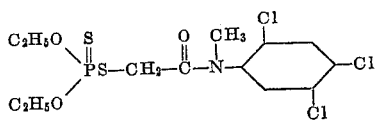

may, with equal success, replace the ester of the preceding paragraph in the therein-described formulation.

EXAMPLE 20

50 parts of the ester of the formula

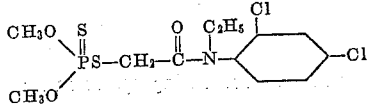

are admixed with 40 parts of laurylhexaglycolether and 10 parts of xylene, a clear water-emulsifiable solution being obtained. An aqueous emulsion of this solution, which emulsion contains 0.02% of the ester, has a quick killing action on all stages of spider mites.

The ester of the preceding paragraph may, while otherwise proceeding as described therein, be replaced by either of the esters of the formulae

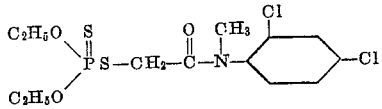

or

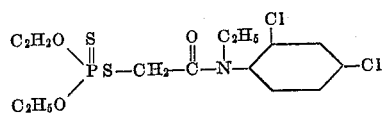

EXAMPLE 21

A pulverulent agent, of good suspendability in water, is obtained by thoroughly admixing 15 parts of the ester of the formula

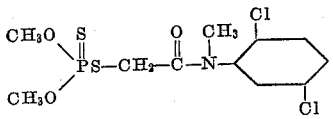

with 3 parts of tert. dodecylmercaptanundecaglycolether, 7 parts of pulverulent silica gel and 75 parts of kaolin. A suspension in water of this agent, containing 0.02% of the said ester, kills all stages of spider mites.

The ester of the preceding paragraph may be replaced by a corresponding quantity of an ester of any one of the formulae

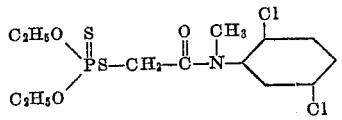

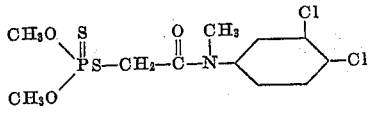

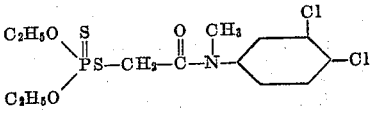

or

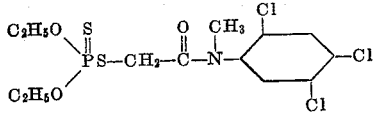

EXAMPLE 22

5 parts of the ester of the formula

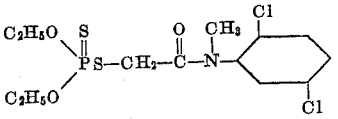

are admixed with 5 parts of cyclohexanone, 5 parts of xylene, 5 parts of diethyleneglycol and 5 parts of isooctylphenyloctaglycolether, and a clear solution of good emulsifiability in water is obtained. A 0.1% aqueous emulsion of such solution has an unfailing killing action on all stages of spider mites.

The ester of the preceding paragraph may, with equal success, be replaced by a corresponding quantity of any one of the esters of the formulae

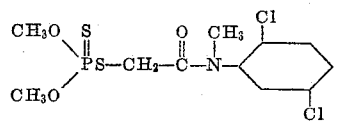

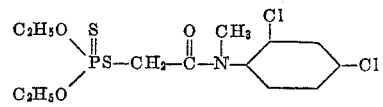

or

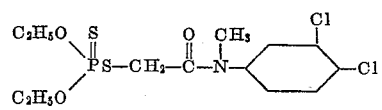

EXAMPLE 23

20 parts of the ester of the formula

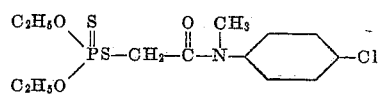

are admixed with 20 parts of diisohexyl-heptylphenylpolyglycolether and 60 parts of a mixture consisting of 3 parts of propyleneglycol per part of butoxyethoxyethanol. The result is an excellently water-emulsifiable agent. An aqueous emulsion of the latter, containing 0.02% of the said ester, has a rapid and unfailing killing action on all stages of spider mites. The said ester may, with equal success, be replaced by a corresponding quantity of the ester of the formula

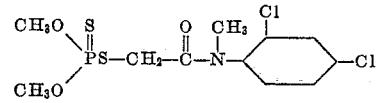

or of the ester of the formula

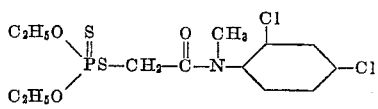

EXAMPLE 24

20 parts of the ester of the formula

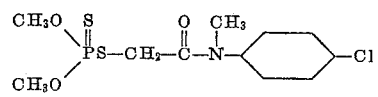

are admixed with 20 parts of laurylhexaglycolether and 60 parts of xylene, and there is thus obtained an agent of good emulsifiability in water. An aqueous emulsion of this agent, containing 0.02% of the said ester, has a 100% killing action on all stages of spider mites. The said ester may, with equal success, be replaced by a corresponding quantity of any one of the esters of the formulae

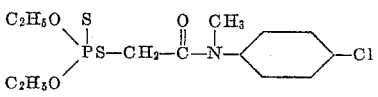

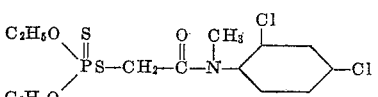

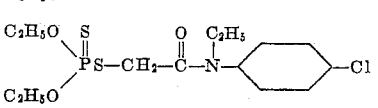

or

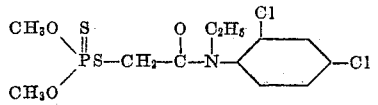

The precedingly-described formulations may be used in combating spider mites, not only in the greenhouse, but also in the field, garden and/or orchard. Thus, the said formulations may be used, ovicidally as well as acaricidally, against spider mites on vegetable plants (bush beans, Lima beans, soy beans, etc.), on flowers (roses, etc.), on fruit trees (apple orchards, citrus orchards, etc.), on tree foliage (red maple, spruce, etc.).

Having thus disclosed the invention what is claimed is:

1. The method of combating spider mites which comprises applying to surfaces of vegetation to be protected an acaricidally effective quantity of a compound of the formula

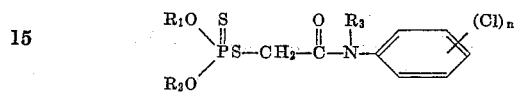

wherein each of $R_1$, $R_2$ and $R_3$ is an alkyl group containing a maximum of two carbon atoms, and wherein $n$ is an integer having a value from 1 to 3 inclusive.

2. The method of combating spider mites which comprises applying to surfaces of vegetation to be protected an acaricidally effective quantity of a compound of the formula

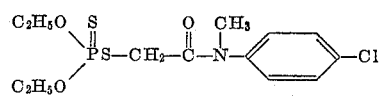

3. The method of combating spider mites which comprises applying to surfaces of vegetation to be protected an acaricidally effective quantity of a compound of the formula

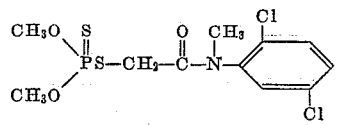

4. The method of combating spider mites which comprises applying to surfaces of vegetation to be protected an acaricidally effective quantity of a compound of the formula

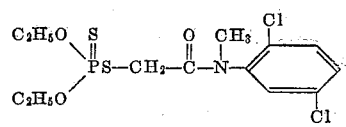

5. The method of combating spider mites which comprises applying to surfaces of vegetation to be protected an acaricidally effective quantity of a compound of the formula

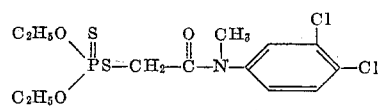

6. The method of combating spider mites which comprises applying to surfaces of vegetation to be protected an acaricidally effective quantity of a compound of the formula

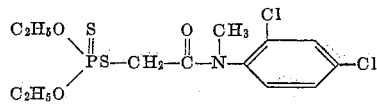

7. The method of combating spider mites which comprises applying to surfaces of vegetation to be protected an acaricidally effective quantity of a compound of the formula

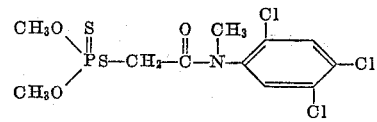

8. The method of combating spider mites which comprises applying to surfaces of vegetation to be protected an acaricidally effective quantity of a compound of the formula

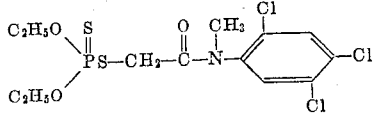

9. A water-emulsifiable acaricidal concentrate consisting essentially of a compound of the formula

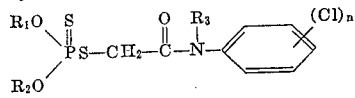

wherein each of $R_1$, $R_2$ and $R_3$ is an alkyl group containing a maximum of two carbon atoms, and wherein $n$ is an integer having a value from 1 to 3 inclusive, and an emulsifier therefor.

10. A water-emulsifiable acaricidal concentrate consisting essentially of a compound of the formula

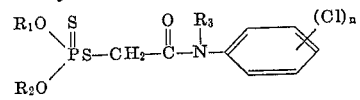

wherein each of $R_1$, $R_2$ and $R_3$ is an alkyl group containing a maximum of two carbon atoms, and wherein $n$ is an integer having a value from 1 to 3 inclusive, an emulsifier therefor, and a solid carrier.

11. An acaricide consisting essentially of an aqueous emulsion of a compound of the formula

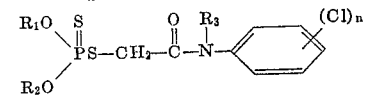

wherein each of $R_1$, $R_2$ and $R_3$ is an alkyl group containing a maximum of two carbon atoms, and wherein $n$ is an integer having a value from 1 to 3 inclusive, said acaricide containing 0.005 to 0.1% by weight of said compound.

12. An acaricide consisting essentially of an aqueous dispersion of a compound of the formula

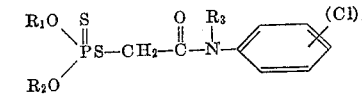

wherein each of $R_1$, $R_2$ and $R_3$ is an alkyl group containing a maximum of two carbon atoms, and wherein $n$ is an integer having a value from 1 to 3 inclusive, said acaricide containing 0.005 to 0.1% by weight of said compound.

13. A compound of the formula

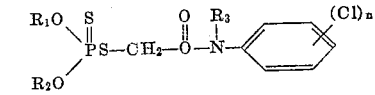

wherein each of $R_1$, $R_2$ and $R_3$ is an alkyl group containing a maximum of two carbon atoms, and wherein $n$ is an integer having a value from 1 to 3 inclusive.

14. A compound of the formula

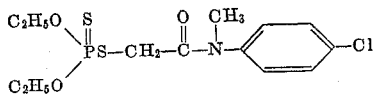

15. A compound of the formula

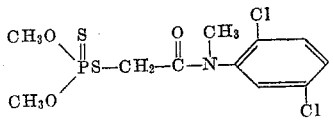

16. A compound of the formula

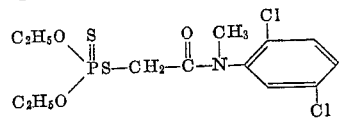

17. A compound of the formula

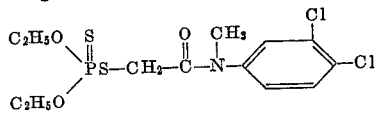

18. A compound of the formula

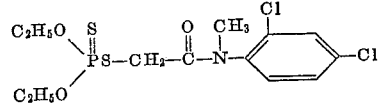

19. A compound of the formula

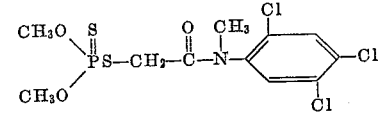

20. A compound of the formula

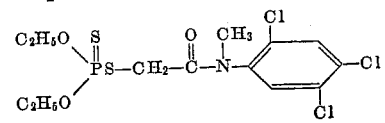

References Cited in the file of this patent

UNITED STATES PATENTS

| | | |
|---|---|---|
| 2,139,190 | Iselin | Dec. 6, 1938 |
| 2,325,331 | Martin et al. | July 27, 1943 |
| 2,343,071 | Martin et al. | Feb. 29, 1944 |
| 2,494,283 | Cassaday et al. | Jan. 10, 1950 |
| 2,752,393 | Martin et al. | June 26, 1956 |

FOREIGN PATENTS

| | | |
|---|---|---|
| 83,545 | Denmark | May 13, 1957 |
| 84,182 | Denmark | Sept. 2, 1957 |
| 216,407 | Australia | July 30, 1958 |
| 1,193,017 | France | Apr. 27, 1959 |